United States Patent
Gupta et al.

(10) Patent No.: US 9,032,727 B2
(45) Date of Patent: May 19, 2015

(54) SUCTION SEALING FOR TURBOCHARGER

(71) Applicant: Honeywell International Inc., Morristown, NJ (US)

(72) Inventors: Suryakant Gupta, Varanasi (IN); Parikshit I Mulani, Pune (IN); Poomkuzhimannil Zachariah John, Bangalore (IN); Anish Surendran, Kottayam (IN); Anish Kumar Gupta, Bangalore (IN); S Sundaravel Nambi, Tirunelveli (IN); Santosh V, Hyderabad (IN)

(73) Assignee: Honeywell International Inc., Morristown, NJ (US)

( * ) Notice: Subject to any disclaimer, the term of this patent is extended or adjusted under 35 U.S.C. 154(b) by 154 days.

(21) Appl. No.: 13/687,053

(22) Filed: Nov. 28, 2012

(65) Prior Publication Data

US 2014/0144135 A1    May 29, 2014

(51) Int. Cl.
| | | |
|---|---|---|
| F02D 23/00 | (2006.01) | |
| F02B 37/18 | (2006.01) | |
| F01D 11/00 | (2006.01) | |
| F02C 6/12 | (2006.01) | |

(52) U.S. Cl.
CPC ............. *F02B 37/18* (2013.01); *F01D 11/00* (2013.01); *F02C 6/12* (2013.01); *F05D 2220/40* (2013.01)

(58) Field of Classification Search
CPC ............ F02B 37/18; F01D 11/00; F02C 6/12; F05D 2220/40; F16C 2360/24
USPC ............... 60/602; 415/145, 118, 201, 1
See application file for complete search history.

(56) References Cited

U.S. PATENT DOCUMENTS

| | | | | |
|---|---|---|---|---|
| 1,419,316 A * | 6/1922 | Sherbondy | ............ | 417/43 |
| 1,831,218 A * | 11/1931 | Winter et al. | ............ | 73/861.69 |
| 3,233,403 A * | 2/1966 | MacInnes et al. | ............ | 60/600 |
| 3,360,221 A * | 12/1967 | Heskestad | ............ | 244/208 |
| 3,542,003 A * | 11/1970 | Sarto | ............ | 123/568.18 |
| 4,356,695 A * | 11/1982 | Sumi et al. | ............ | 60/602 |
| 4,659,295 A | 4/1987 | Burdette et al. | | |
| 4,776,167 A * | 10/1988 | Kawamura | ............ | 60/602 |

(Continued)

FOREIGN PATENT DOCUMENTS

GB        2401652 A     11/2004

OTHER PUBLICATIONS

"Flow past a cylinder: shear layer instability and drag crisis", Singh et al., International Journal for Numerical Methods in Fluids, vol. 47, Issue 1, pp. 75-98, Jan. 10, 2005 (published online: Nov. 11, 2004); 41 pages.

(Continued)

*Primary Examiner* — Thai Ba Trieu
*Assistant Examiner* — Jason T Newton
(74) *Attorney, Agent, or Firm* — Brian J. Pangrle

(57) ABSTRACT

A system can include a turbine housing that defines a turbine wheel space, an exhaust chamber in fluid communication with the turbine wheel space and a control shaft bore that extends from the exhaust chamber to an outer surface of the turbine housing; a blunt body positionable above the turbine wheel space where the blunt body includes an opening and a lumen in fluid communication with the opening; and a suction conduit connectable for fluid communication between the control shaft bore of the turbine housing and the lumen of the blunt body. Various other examples of devices, assemblies, systems, and methods are also disclosed.

18 Claims, 9 Drawing Sheets

(56) References Cited

U.S. PATENT DOCUMENTS

| | | | |
|---|---|---|---|
| 5,131,807 A | 7/1992 | Fischer et al. | |
| 5,996,348 A * | 12/1999 | Watkins | 60/602 |
| 6,139,261 A * | 10/2000 | Bishop et al. | 415/148 |
| 6,210,106 B1 * | 4/2001 | Hawkins | 415/160 |
| 6,212,889 B1 * | 4/2001 | Martin | 60/602 |
| 6,767,183 B2 * | 7/2004 | Schilling et al. | 415/160 |
| 7,080,510 B2 * | 7/2006 | Ishihara et al. | 60/602 |
| 7,194,920 B2 * | 3/2007 | Welker | 73/861.65 |
| 7,207,770 B2 * | 4/2007 | Bruce | 415/160 |
| 7,220,098 B2 * | 5/2007 | Bruce et al. | 415/160 |
| 7,445,427 B2 * | 11/2008 | Gutknecht et al. | 415/160 |
| 7,644,583 B2 * | 1/2010 | Leavesley | 60/602 |
| 7,824,161 B2 * | 11/2010 | Tandon | 417/423.11 |
| 7,984,612 B2 * | 7/2011 | Weymann | 60/605.1 |
| 2009/0301082 A1 * | 12/2009 | Lombard et al. | 60/602 |
| 2012/0060495 A1 | 3/2012 | Jacob | |
| 2012/0073269 A1 | 3/2012 | Heverley, III et al. | |

OTHER PUBLICATIONS

"Turbulence Models and Boundary Conditions for Bluff Body Flow", Young et al., 15th Australian Fluid Mechanics Conference, Dec. 13-14, 2004 (4 pages).

* cited by examiner

SUCTION SEALING FOR TURBOCHARGER

TECHNICAL FIELD

Subject matter disclosed herein relates generally to turbomachinery for internal combustion engines.

BACKGROUND

Turbochargers include various components to handle flow of fluids such as air, exhaust, etc. Unwanted leakage of exhaust from a turbocharger, for example, via one or more clearances within a bore that supports a control shaft, can impact emissions. Further, where the exhaust carries particulate matter, deposition of such matter in the one or more clearances may impact force required to rotate the control shaft. Various examples of technologies, techniques, etc., described herein, may reduce unwanted leakage of fluid or fluids in or from a turbocharger.

BRIEF DESCRIPTION OF THE DRAWINGS

A more complete understanding of the various methods, devices, assemblies, systems, arrangements, etc., described herein, and equivalents thereof, may be had by reference to the following detailed description when taken in conjunction with examples shown in the accompanying drawings where.

DETAILED DESCRIPTION

Figure 1:
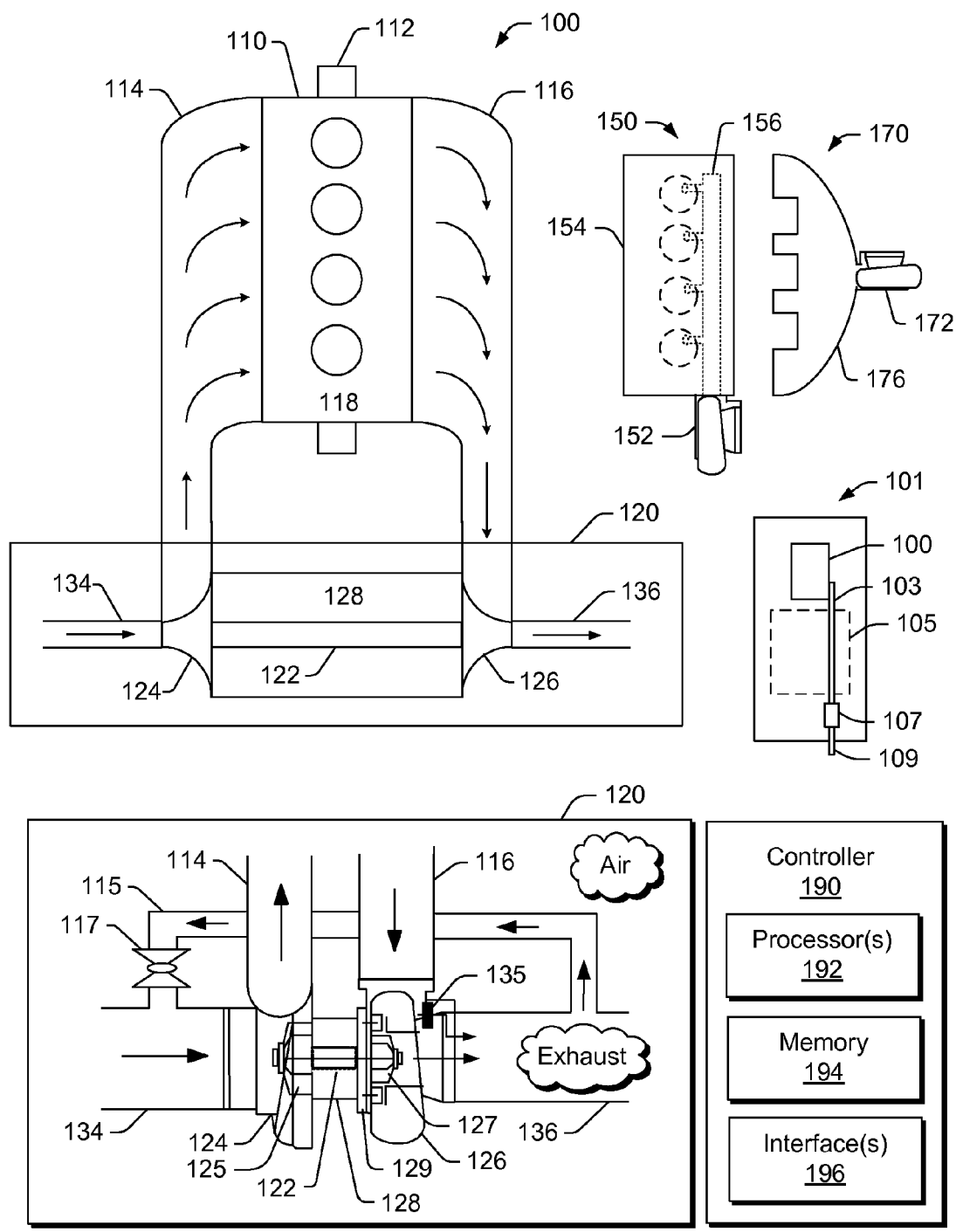
FIG. 1 is a diagram of an example of a turbocharger and an internal combustion engine along with a controller.

Turbochargers are frequently utilized to increase output of an internal combustion engine. Referring to FIG. 1, an example of a turbocharged system 100 includes an internal combustion engine 110 and a turbocharger 120. As shown in FIG. 1, the system 100 may be part of a vehicle 101 where the system 100 is disposed in an engine compartment and connected to an exhaust conduit 103 that directs exhaust to an exhaust outlet 109, for example, located behind a passenger compartment 105. In the example of FIG. 1, a treatment unit 107 may be provided to treat exhaust (e.g., to reduce emissions via catalytic conversion of molecules, etc.).

In the example of FIG. 1, the internal combustion engine 110 includes an engine block 118 housing one or more combustion chambers that operatively drive a shaft 112 (e.g., via pistons). As shown in FIG. 1, an intake port 114 provides a flow path for air to the engine block 118 while an exhaust port 116 provides a flow path for exhaust from the engine block 118.

The turbocharger 120 acts to extract energy from the exhaust and to provide energy to intake air, which may be combined with fuel to form combustion gas. As shown in FIG. 1, the turbocharger 120 includes an air inlet 134, a shaft 122, a compressor housing assembly 124 for a compressor wheel 125, a turbine housing assembly 126 for a turbine wheel 127, another housing assembly 128 and an exhaust outlet 136, which, for example, may be in fluid communication with the exhaust conduit 103 of the vehicle 101. The housing assembly 128 may be referred to as a center housing assembly as it is disposed between the compressor housing assembly 124 and the turbine housing assembly 126. The shaft 122 may be a shaft assembly that includes a variety of components. The shaft 122 may be rotatably supported by a bearing system (e.g., journal bearing(s), rolling element bearing(s), etc.) disposed in the housing assembly 128 (e.g., in a bore defined by one or more bore walls) such that rotation of the turbine wheel 127 causes rotation of the compressor wheel 125 (e.g., as rotatably coupled by the shaft 122). As an example a center housing rotating assembly (CHRA) can include the compressor wheel 125, the turbine wheel 127, the shaft 122, the housing assembly 128 and various other components (e.g., a compressor side plate disposed at an axial location between the compressor wheel 125 and the housing assembly 128).

In the example of FIG. 1, a variable geometry assembly 129 is shown as being, in part, disposed between the housing assembly 128 and the housing assembly 126. Such a variable geometry assembly may include vanes or other components to vary geometry of passages that lead to a turbine wheel space in the turbine housing assembly 126. As an example, a variable geometry compressor assembly may be provided.

In the example of FIG. 1, a wastegate valve (or simply wastegate) 135 is positioned proximate to an exhaust inlet of the turbine housing assembly 126 (e.g., upstream of the turbine wheel 127). The wastegate valve 135 can be controlled to allow at least some exhaust from the exhaust port 116 to bypass the turbine wheel 127. Various wastegates, wastegate components, etc., may be applied to a conventional fixed nozzle turbine, a fixed-vaned nozzle turbine, a variable nozzle turbine, a twin scroll turbocharger, etc.

In the example of FIG. 1, an exhaust gas recirculation (EGR) conduit 115 is also shown, which may be provided, optionally with one or more valves 117, for example, to allow exhaust to flow to a position upstream the compressor wheel 125.

FIG. 1 also shows an example arrangement 150 for flow of exhaust to an exhaust turbine housing assembly 152 and another example arrangement 170 for flow of exhaust to an exhaust turbine housing assembly 172. In the arrangement 150, a cylinder head 154 includes passages within to direct exhaust from cylinders to the turbine housing assembly 152 while in the arrangement 170, a manifold 176 provides for mounting of the turbine housing assembly 172, for example, without any separate, intermediate length of exhaust piping. In the example arrangements 150 and 170, the turbine housing assemblies 152 and 172 may be configured for use with a wastegate, variable geometry assembly, etc.

In FIG. 1 an example of a controller 190 is shown as including one or more processors 192, memory 194 and one or more interfaces 196. Such a controller may include circuitry such as circuitry of an engine control unit (ECU). As described herein, various methods or techniques may optionally be implemented in conjunction with a controller, for example, through control logic. Control logic may depend on one or more engine operating conditions (e.g., turbo rpm, engine rpm, temperature, pressure, load, lubricant, cooling, etc.). For example, sensors may transmit information to the controller 190 via the one or more interfaces 196. Control logic may rely on such information and, in turn, the controller 190 may output control signals to control engine operation. The controller 190 may be configured to control lubricant flow, temperature, pressure, a variable geometry assembly (e.g., variable geometry compressor or turbine), a wastegate (e.g., via an actuator), an electric motor, or one or more other components associated with an engine, a turbocharger (or turbochargers), etc.

Figure 2:
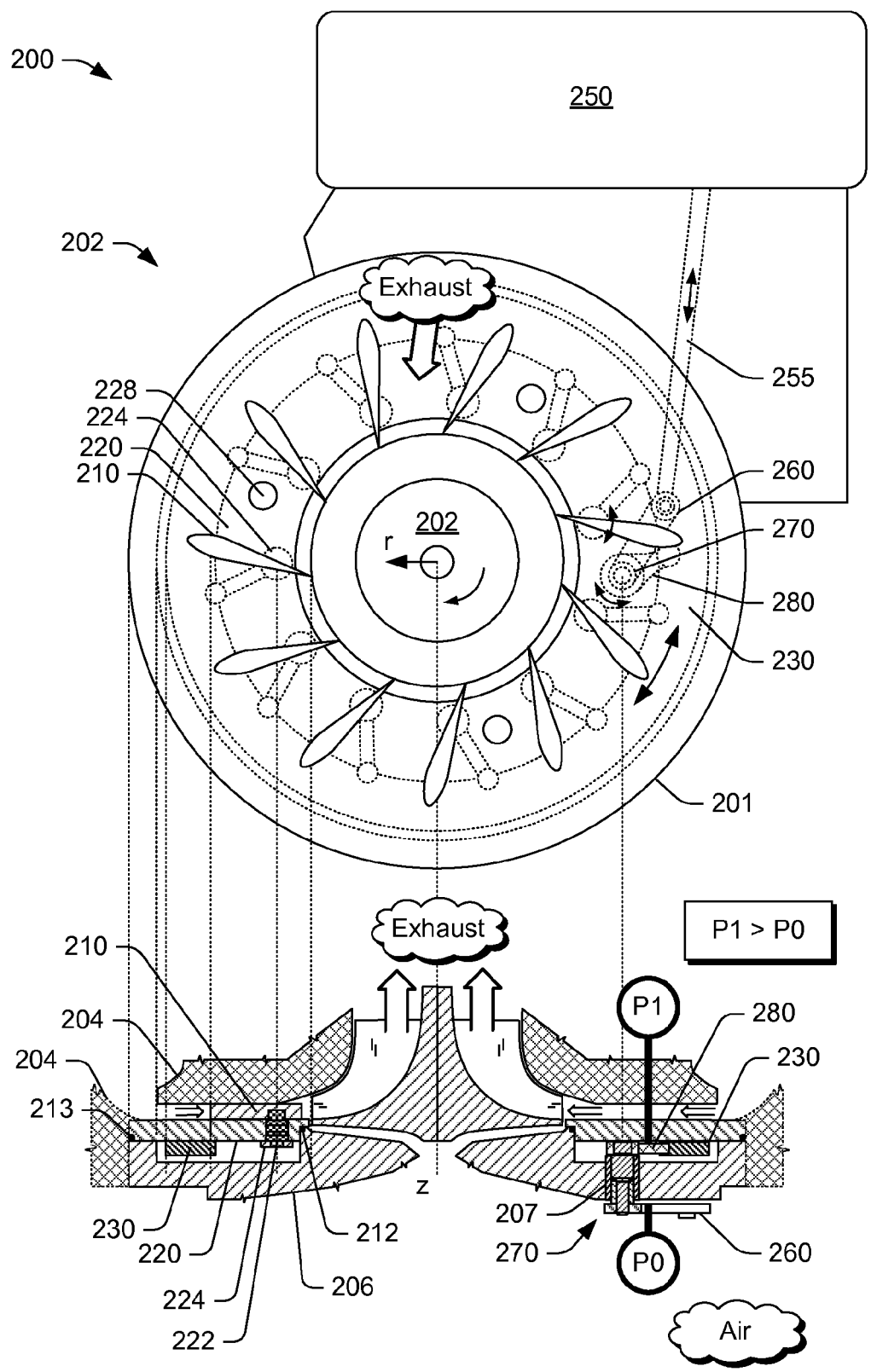
FIG. 2 is a series of view of an example of a variable geometry assembly that includes a control shaft disposed in a control shaft bore.

FIG. 2 shows a top view of an example of an assembly 200 that includes various turbine assembly components 202, which may be coupled to a center housing, along with a variable geometry controller 250, which may be operably coupled to an ECU (see, e.g., the controller 190 of FIG. 1). A cross-sectional view of various components is also shown. In the example of FIG. 2, the assembly 200 includes a control shaft 270 that interconnects an outer control arm 260 with an inner crank arm 280. As shown in FIG. 2, the control shaft 270 is disposed in a control shaft bore 207 of a component 206 where the control shaft bore 207 extends between an exhaust environment and an ambient or air environment. The exhaust environment may have a pressure P1 and the air environment may have a pressure P0. During operation, pressure P1 may exceed pressure P0 and a resulting pressure differential (P1−P0) may act as a driving force for leakage of exhaust from the exhaust environment to the air environment via one or more clearances within the control shaft bore 207.

In the example of FIG. 2, a plurality of vanes (see, e.g., an individual vane labeled 210) may be adjusted via rotation of the control shaft 270 to alter geometry of an annular flow section, which is defined by a turbine housing 204 (e.g., optionally an insert) and an annular nozzle ring 220. The annular arrangement of vanes, the turbine housing 204 and the annular nozzle ring 220 define a plurality of nozzles for passage of exhaust from a volute defined at least in part by the turbine housing 204 to the turbine wheel 202. While the example of FIG. 2 includes eleven vanes, other examples may include a different number of vanes, or as already mentioned, use a different mechanism to vary geometry of a converging flow section (e.g., converging radially toward a turbine wheel).

In the example of FIG. 2, the vane 210 is supported on a vane shaft 222, which forms a rotational axis for the vane 210 that has a longitudinal direction that extends between a substantially planar surface of the housing 204 and a substantially planar surface of the annular nozzle ring 220, generally parallel to the axis of rotation of the turbine wheel 202.

The vane 210 is shown as having an elongated teardrop or wedge shape. A leading edge of the vane 210 may be directed upstream, against the flow of exhaust in the annular flow section, and a trailing edge of the vane 210 may be directed downstream. Specifics of the vane 210 are given as examples as a vane having another suitable shape may be used.

In the example of FIG. 2, the vane 210 is connected by its vane shaft 222 to a vane arm 224, for example, by welded, orbital riveting, etc., such that the vane 210, its vane shaft 222, and its vane arm 224 can move together as a unit. As shown, the vane arm 224 includes an enlarged inner end defining an eye for receiving the vane shaft 222 whereby the vane arm 224 is connected to a medial portion of the vane 210. In the example of FIG. 2, the vane arm 224 includes a vane arm shaft that connects the inner end of the vane arm to its round outer end knob. As shown, a unison ring 230 includes a plurality of sockets where each socket receives an outer end knob of a vane arm (see, e.g., the vane arm 224). The sockets allow for some movement (e.g., rotation) of the outer end knobs but also may secure the outer end knobs to some extent.

With respect to cooperation between various components of the assembly 200, in the example of FIG. 2, the nozzle ring 220 mounts between the turbine housing 204 and a center housing or the component 206, which may be a back plate, etc. O-rings or other sealing components 212, 213 may be used to form seals between the nozzle ring 220 and one or more other components (e.g., the turbine housing 204 and the component 206).

In the example of FIG. 2, adjustment of the vanes can occur upon rotation of the unison ring 230 about its axis, typically coincident with the rotational axis of the turbine wheel 202. More specifically, rotation of the unison ring 230, with the vane arms pivotally attached thereto by their movable engagement in the sockets, permits the rotational position of the vanes to be adjusted. By adjusting the rotational position of the vanes, the passage area in the annular flow section is regulated. For example, the passage area can decrease by moving the vanes in a direction for aligning the vanes with the tangential direction with respect to the turbine wheel 202; whereas, the passage area can increase by moving the vanes in a direction for aligning the vanes with the radial direction of the turbine wheel 202. In such a manner, by movement of the vanes, flow can be altered (e.g., pressure, velocity, flow rate). Alteration of flow can, in turn, affect turbocharger performance and hence engine performance. Thus, in the example of FIG. 2, vanes can be adjusted to optimize engine performance.

With respect to control of a variable geometry turbine, in the example of FIG. 2, the vanes are controlled by a crank mechanism operably connected to the unison ring 230. The crank mechanism includes a control rod 255 operably connected to the control unit 250 and the control arm 260, which is operably connected to the control shaft 270, which is operably connected to the crank arm 280. As shown, the crank arm 280 is operably connected to the unison ring 230. In the example of FIG. 2, the control rod 255 may translate to cause movement of the control shaft 270, which can cause movement of the crank arm 280, which can, in turn, cause rotation of the unison ring 230 and the vanes.

The controller 250 for controlling the variable geometry turbine components of FIG. 2 may include a processor and memory where the memory stores information for use in control, to enable control, to enhance diagnostics (e.g., black box), etc. In the example of FIG. 2, the controller 250 can include an actuator (e.g., a vacuum actuator, electronic actuator, a hydraulic actuator, etc.) to move the control rod 255 where movement of the control rod 255 causes the geometry of the annular flow section to vary (e.g., by movement of the vanes). The controller 250 optionally includes a position sensor to facilitate control or to ascertain vane position. For example, where vane position is not readily inferred from the actuator, then a position sensor may be used to sense position of a control component (e.g., the control rod 255, the control arm 260, the control shaft 270, the crank arm 280, the unison ring 230, the vane 210, etc.) to thereby determine vane position.

As mentioned, the control shaft 270 as positioned in the control shaft bore 207 extends between two environments where one environment can have a higher operational pressure than the other environment (e.g., P1>P0). Thus, during operation of the arrangement of FIG. 2, the control shaft 270, as positioned in the control shaft bore 207, is exposed to a pressure gradient. The higher pressure environment P1 is referred to as an exhaust environment that may be in direct contact with exhaust gas while the lower pressure environment P0 is referred to as an ambient or air environment that is, in general, not in direct contact with exhaust gas (e.g., unless undesirable leaking occurs from the exhaust environment to the ambient environment).

Figure 3:
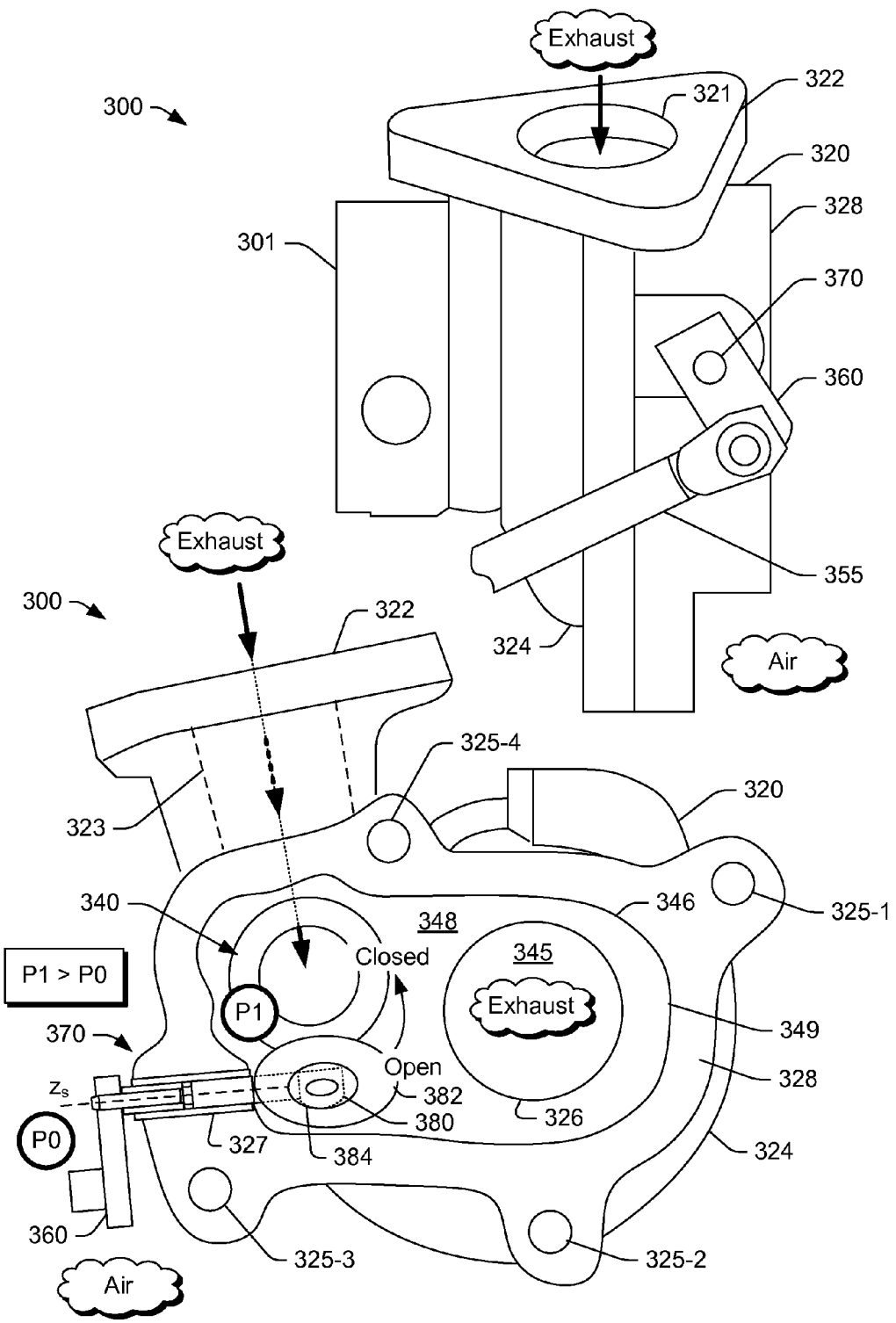
FIG. 3 is a series of views of an example of a turbine housing assembly that includes a control shaft disposed in a control shaft bore.

FIG. 3 shows an example of an assembly 300 that includes a center housing 301 and a turbine housing assembly 320 with a wastegate 380. In the example of FIG. 3, the wastegate 380 is operably connected to a control shaft 370 positioned in a control shaft bore 327 of the turbine housing assembly 320. During operation of the turbocharger, the control shaft 370 is exposed to an exhaust environment that can have a pressure P1 and an ambient or air environment that can have a pressure P0 where P1 may be greater than P0. As shown, the control shaft 370 is positioned in the control shaft bore 327 and operably connected to a control arm 360 that is operably connected to a control rod 355. In the example of FIG. 3, actuation of the control rod 355 can cause the wastegate 380 to be positioned with respect to an opening 340 that provides an exhaust gas bypass for exhaust to bypass a turbine wheel space.

In the example of FIG. 3, the turbine housing assembly 320 includes an exhaust inlet flange 322 that includes an opening 321 (e.g., or openings) for a passage 323. The passage 323 is in fluid communication with a volute formed by a volute wall 324. In the example of FIG. 3, a nozzle (e.g., annular opening, etc.) may provide for flow of exhaust from the volute to a turbine wheel space where an opening 326 provides for flow of exhaust from the turbine wheel space to a chamber 345, for example, formed at least in part by a chamber wall 346 and a chamber floor 348.

As shown in the example of FIG. 3, the opening 340 exists in the chamber floor 348 and may be covered by the wastegate 380 (e.g., a plug portion 382 of the wastegate 380) responsive to rotation of the control shaft 370 in the control shaft bore 327. For example, the control shaft 370 may extend to a wastegate arm 384 (see dashed line) that connects the control shaft 370 to the plug portion 382 of the wastegate 380. In such an example, rotation of the control shaft 370 about a control shaft axis $z_s$ can act to position the plug portion 382 of the wastegate 380 in an open position or a closed position with respect to the opening 340. In the open position, the passage 323 is in fluid communication with the chamber 345 via the opening 340 in the chamber floor 348. In the open position, exhaust received via the opening 321 of the exhaust inlet flange 322 may bypass the volute formed by the volute wall 324.

In the example of FIG. 3, the chamber wall 346 extends to a flange portion 328 to define an exhaust outlet opening 349. Exhaust received by the chamber 345, whether via the opening 340 or the opening 326 may exit the turbine housing assembly 320 via the exhaust outlet opening 349. As an example, a conduit may be attached to the flange portion 328 via attachment mechanisms, for example, that may cooperate with openings 325-1, 325-2, 325-3, and 325-4. Exhaust received by such a conduit (e.g., from the exhaust outlet opening 349) may flow to equipment such as a catalytic converter, a muffler (e.g., sound absorber), etc., and eventually to an ambient or air environment (see, e.g., the vehicle 101 of FIG. 1), which may be, for example, at the pressure P0.

For assemblies such as those of FIG. 2 and FIG. 3, exhaust has been known to leak around a control shaft disposed in a control shaft bore where the control shaft bore extends between an exhaust environment and an air environment having a pressure differential therebetween. In an effort to reduce leakage, a control shaft may be positioned in a control shaft bore along with a bushing that, for example, helps to form a seal around the control shaft as positioned in the control shaft bore.

As shaft diameter decreases, such an approach tends to becomes less effective; noting that a smaller shaft diameter may have operational advantages, for example, as to minimizing hysteresis (e.g., force required to rotate the shaft in one direction is different than force required to rotate the shaft in an opposite direction). A particular issue for sealing small diameter shafts relates to seal rings (e.g., piston rings). For example, elasticity issues can become more problematic as ring diameter decreases as materials used for construction of piston rings tend to have elasticities that are suited to larger diameters.

To reduce leakage from an exhaust environment to an air environment, as an example, a conduit may be provided that has a pressure less than that of the exhaust environment and less than that of the air environment. In such an example, exhaust may flow from the exhaust environment to the conduit, which may reduce leakage of exhaust from the exhaust environment to the air environment.

Figure 4:
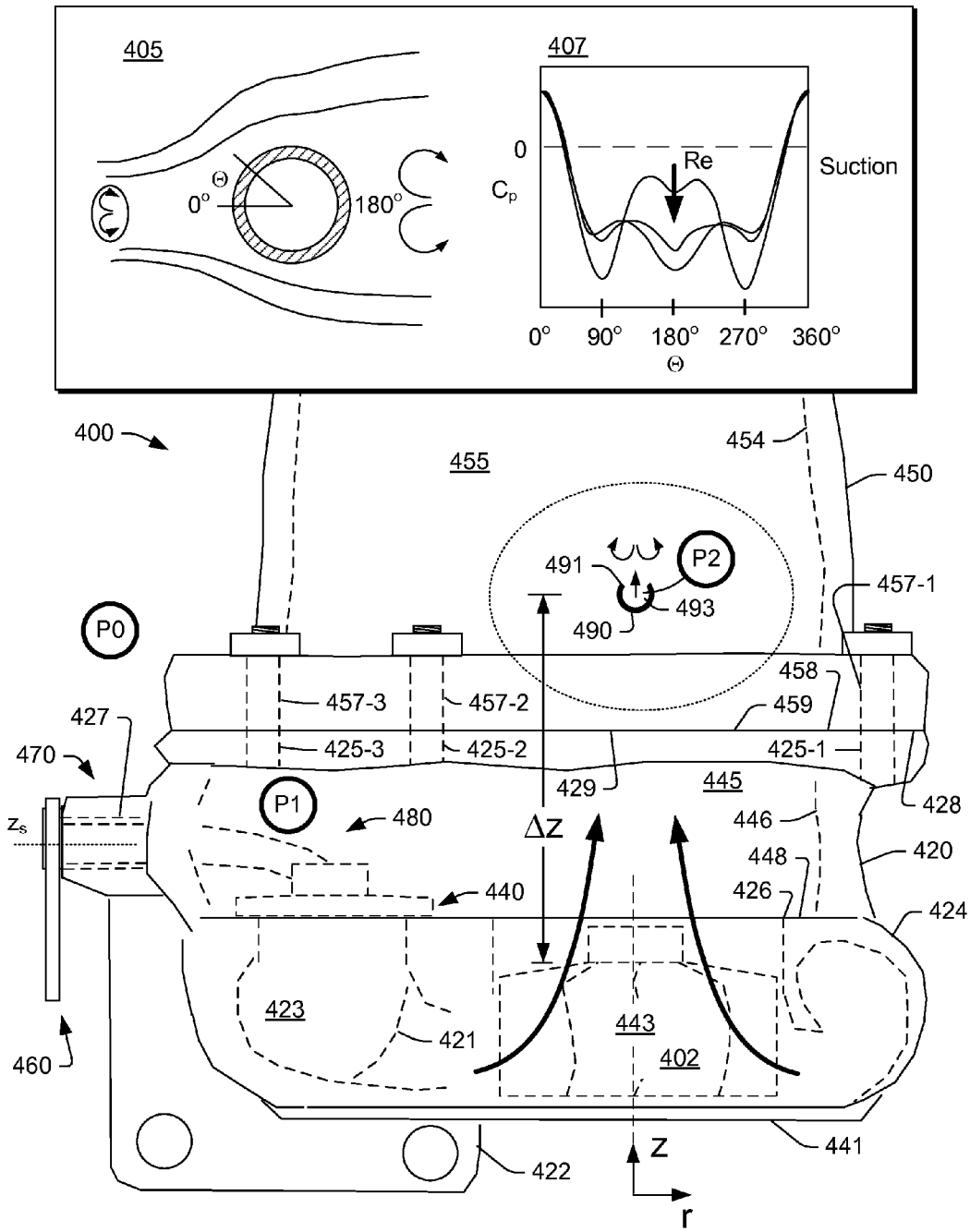
FIG. 4 is a view of an example of an assembly that includes a blunt body positioned above a turbine wheel along with a diagram of flow about a blunt body and pressure profiles for such flow at the surface of the blunt body.

FIG. 4 shows an example of an assembly 400, an example of a diagram 405 of flow about a blunt body and an example of a plot 407 of pressure about a blunt body with respect to position and Reynolds number.

As to Reynolds number, as an example, for a density of exhaust of about 1.2 kg/m$^3$, a characteristic length of about 0.075 meter (e.g., about 3 inches) and a dynamic viscosity of about 3×10$^{-5}$ kg/m-s (e.g., about 400 degrees C.), Reynolds number as a function of velocity (v) would be about 27,000*v. Given the foregoing function, for flow to remain fully laminar, exhaust velocity would have to be about 0.08 m/s. As exhaust velocity in an exhaust system of an internal combustion engine (see, e.g., FIG. 1) tends to be higher even at idle, exhaust flow will tend to be turbulent during operation.

In FIG. 4, the diagram 405 shows a blunt body in a turbulent flow stream with respect to a coordinate system having an origin at a center of the blunt body such that surface positions on the blunt body may be described with respect to angles ranging from 0 degrees to 360 degrees. In the plot 407, time averaged pressure ($C_p$) is at a maximum at 0 degrees (i.e., 360 degrees). As Reynolds number (Re) increases, the pressure at 180 degrees decreases. In particular, suction exists about the surface of the blunt body for angles ranging from about 45 degrees to about 315 degrees. Further, for various Reynolds numbers, surface pressure minima exist at about 90 degrees and at about 270 degrees and, as Reynolds number increases, a surface pressure minimum exists at about 180 degrees. Thus, per the example of FIG. 4, turbulent flow about a blunt body can generate suction pressures.

In the example of FIG. 4, a blunt body 490 is positioned a distance above a turbine wheel 402 (e.g., above a turbine wheel space). As shown, the blunt body 490 includes an opening 491 that faces away from the turbine wheel 402 (e.g., away from a turbine wheel space). The blunt body 490 has a lumen 493 such that fluid can flow through the blunt body 490 and exit the blunt body 490 via the opening 491. In such an example, a pressure P2 may be generated in the lumen 493 that is less than a pressure P1 of an exhaust environment and less than a pressure P0 of an ambient or air environment. For the assembly 400, given the blunt body 490 positioned above the turbine wheel 402, a pressure P2 may be generated and implemented to alter pressure at another portion of the assembly 400.

As to position of the blunt body 490, in the example of FIG. 4, it is shown as being in a region (see, e.g., dashed oval)

above the turbine wheel 402 at a distance Δz from the turbine wheel 402, where a direction z corresponds to a direction along a rotational axis of the turbine wheel 402.

In the example of FIG. 4, the assembly 400 includes a turbine housing 420 (e.g., or housing assembly), an exhaust conduit 450, a control arm 460, a control shaft 470 and a wastegate 480. The turbine housing 420, which may be a cast housing, includes a mount 441 for mounting the turbine housing 420 to a component such as a center housing; an opening 421 in an exhaust inlet flange 422; a passage 423 in fluid communication with the opening 421; a volute wall 424 forming a volute to direct exhaust to a turbine wheel space 443 for the turbine wheel 402; openings 425-1, 425-2, 425-3 for attachment mechanisms; an opening 426 to the turbine wheel space 443; a control shaft bore 427 for receipt of the control shaft 470; a flange portion 428 for connecting the turbine housing 420 to an exhaust conduit (e.g., the conduit 450); an exhaust outlet opening 429; a wastegate opening 440; and a chamber 445 defined at least in part by a chamber wall 446 and a chamber floor 448 where exhaust may flow from the chamber 445 through the exhaust outlet opening 429 and to a conduit attached to the turbine housing 420 via attachment mechanisms that cooperate with the openings 425-1, 425-2 and 425-3 (e.g., and optionally other openings). As an example, threaded rods may be received by the openings 425-1, 425-2 and 425-3 where nuts may be threaded thereon to attach another component or components (e.g., a conduit, a conduit and a gasket, etc.).

In the example of FIG. 4, the exhaust conduit 450 includes a conduit wall 454 that defines a passage 455. As shown, the exhaust conduit 450 includes a flange 458 that can include various openings 457-1, 457-2 and 457-3 that can cooperate with attachment mechanisms to attach the exhaust conduit 450 to another component such as the turbine housing 420. In the example of FIG. 4, the exhaust conduit 450 includes an opening 459 that can receive fluid for flow to the passage 455. As shown, exhaust may flow from the chamber 445 to the passage 455 via the opening 429 of the turbine housing 420 and the opening 459 of the exhaust conduit 450.

In the example of FIG. 4, the blunt body 490 is positioned in the passage 455 a distance above the turbine wheel space 443 (e.g., or the turbine wheel 402). During operation, exhaust may be received by the opening 421 of the exhaust inlet flange 422 of the turbine housing 420, flow to the chamber 445 via the opening 440, the opening 426 or both, and thereafter encounter the blunt body 490. As an example, as the exhaust flow encounters the blunt body 490, the opening 491 acts to create a suction pressure that causes fluid to flow in the lumen 493 to the passage 455 (e.g., assuming the lumen 493 has an opening or openings to receive the fluid).

Figure 5:
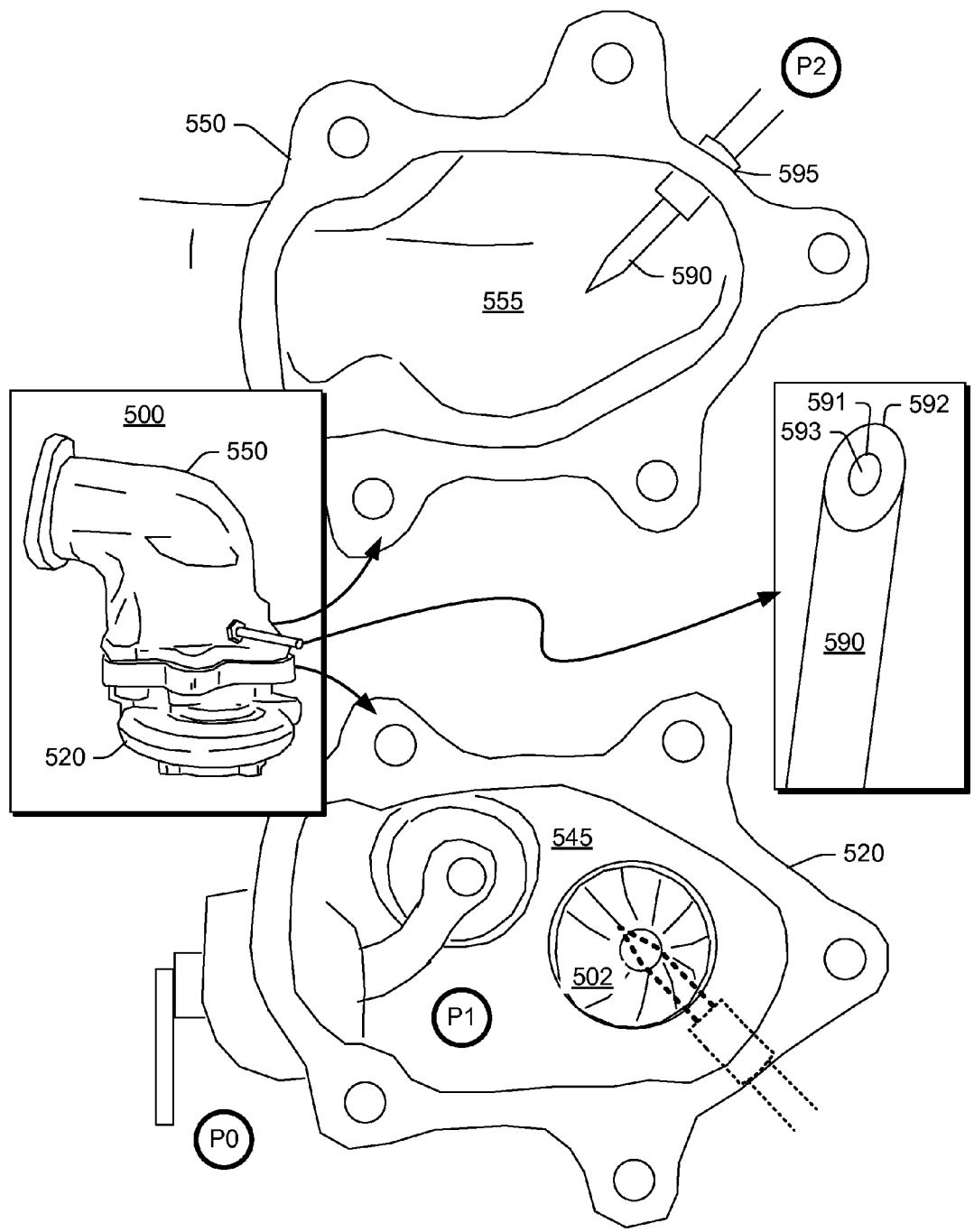
FIG. 5 is a series of views of an example of an assembly that includes a blunt body positionable above a turbine wheel.

FIG. 5 shows various views of an example of an assembly 500 that includes a turbine housing 520 (e.g., or a turbine housing assembly), an exhaust conduit 550 and a blunt body 590. Various features of the assembly 500 may be understood with reference to various features of the assembly 400 of FIG. 4.

In the example of FIG. 5, when assembled, the assembly 500 connects a chamber 545 of the turbine housing 520 with a passage 555 of the exhaust conduit 550. During operation, the chamber 545 may have an exhaust pressure P1 and the blunt body 590 may generate a pressure P2 that is less than P1 and less than a pressure P0 of an ambient or air environment. In the example of FIG. 5, the blunt body 590 includes an opening 591 in a tip or end 592 where the opening 591 is in fluid communication with a lumen 593 (e.g., the opening 591 is an opening of the lumen 593). A mount 595 mounts the blunt body 590 to the exhaust conduit 550 and provides for positioning of the blunt body 590 in the passage 555. As shown, the position of the blunt body 590 in the passage 555 corresponds to a position above a turbine wheel 502. In such a manner, exhaust may flow and encounter the blunt body 590 and generate a pressure P2 in the lumen 593 where the pressure P2 is less than that of a pressure P1 in the chamber 545 and less than a pressure P0 of an environment about the turbine housing 520.

Figure 6:
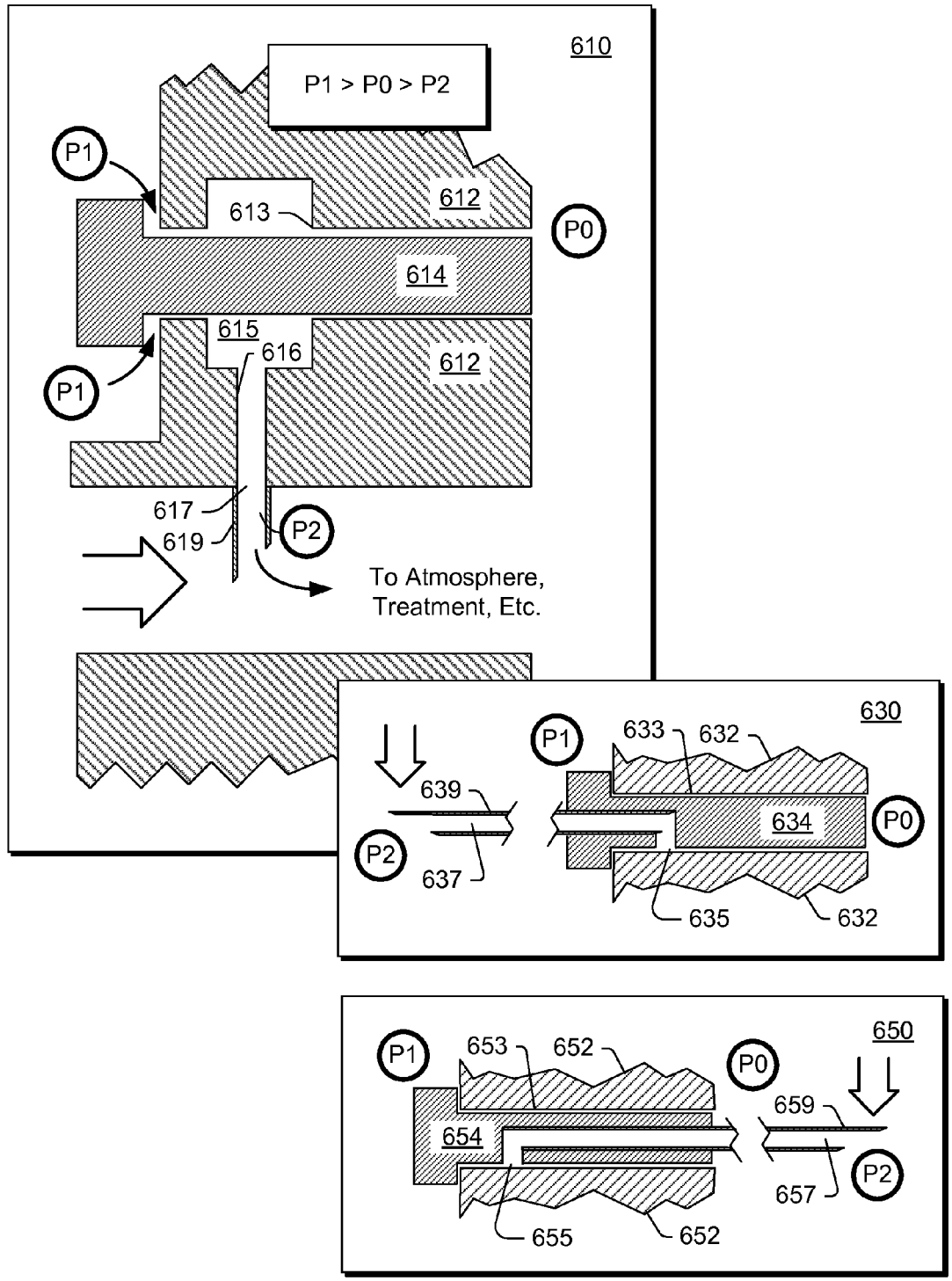
FIG. 6 is a series of views of examples of assemblies.

FIG. 6 shows cross-sectional views of various examples 610, 630 and 650 of a lumen that can provide a pressure that acts to reduce pressure with respect to one or more spaces within a bore. In the examples of FIG. 6, a bore provides for positioning of a control shaft, as such, the bore may be referred to as a control shaft bore (e.g., consider a cylindrical bore with a cylindrical shaft).

In the example 610 of FIG. 6, a structure 612 defines a bore 613 for a shaft 614 as well as a space 615 and an intersecting bore 616 where a lumen 617 is in fluid communication with a blunt body 619 disposed in a passage whereby flow in the passage can generate a pressure P2 in the lumen 617 that can act to extract fluid from the space 615 (e.g., in part via the intersecting bore 616).

In the example 630 of FIG. 6, a structure 632 defines a bore 633 for a shaft 634 as well as a space 635 where a lumen 637 is in fluid communication with a blunt body 639 disposed in a passage whereby flow in the passage can generate a pressure P2 in the lumen 637 that can act to extract fluid from the space 635. As shown, the lumen 637 may extend into the shaft 634 with an opening or openings along a portion of the shaft 634 disposed in the bore 633.

In the example 650 of FIG. 6, a structure 652 defines a bore 653 for a shaft 654 as well as a space 655 where a lumen 657 is in fluid communication with a blunt body 659 disposed in a passage whereby flow in the passage can generate a pressure P2 in the lumen 657 that can act to extract fluid from the space 655. As shown, the lumen 657 may extend into the shaft 654 with an opening or openings along a portion of the shaft 654 disposed in the bore 653.

Figure 7:
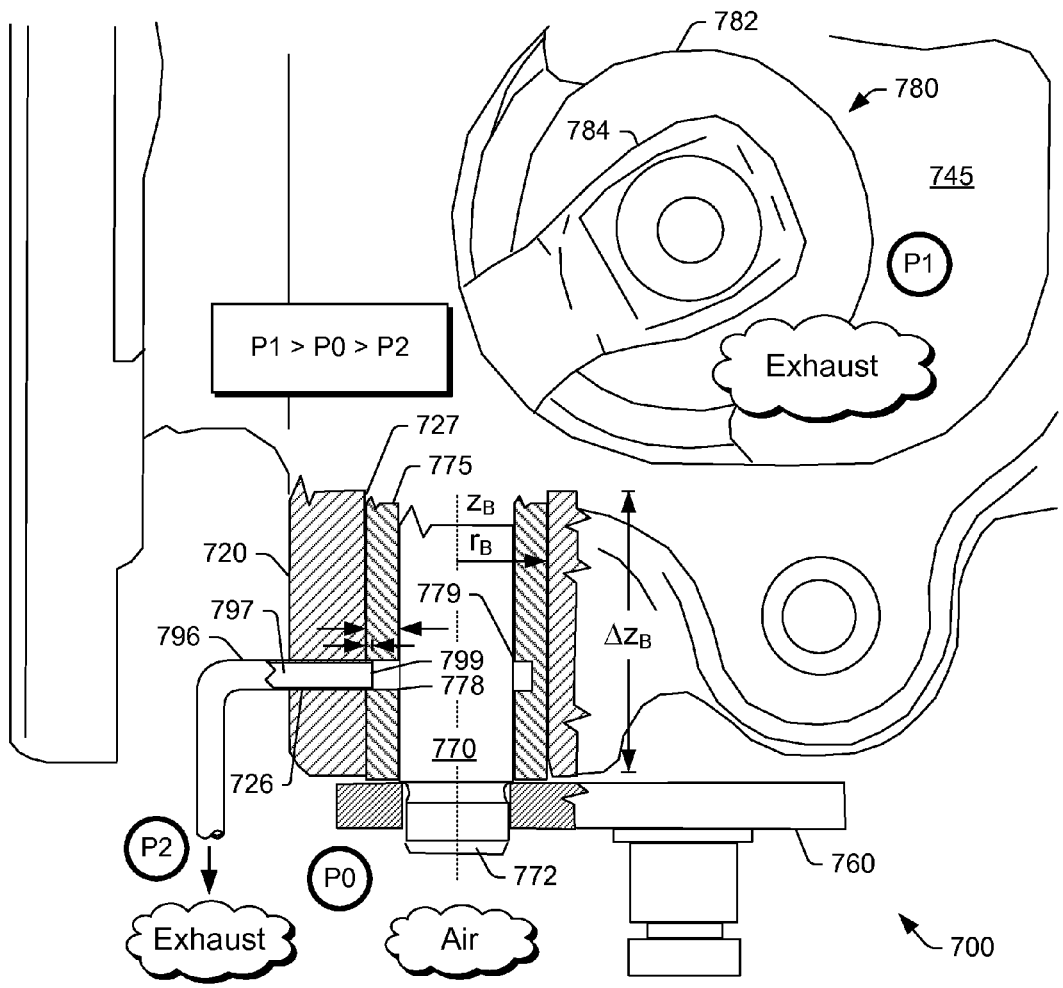
FIG. 7 is a cutaway view of an example of an assembly that includes a control shaft disposed in a control shaft bore for controlling a wastegate.

FIG. 7 shows an example of an assembly 700 that includes a housing 720 with a bore 727 that extends between an exhaust environment, associated with a chamber 745, that may have a pressure P1 and an ambient or air environment that may have a pressure P0. As shown, the bore 727 may be defined by a bore axis ($z_B$) and a bore radius ($r_B$) as well as a bore length ($\Delta z_B$) along the bore axis ($z_B$). In the example of FIG. 7, a shaft 770 is disposed in the bore 727 along with a bushing 775 and the housing 720 defines an intersecting bore 726 that intersects the bore 727. As an example, the shaft 770 may be defined by a shaft axis ($z_s$) and a shaft radius ($r_s$). The shaft 770 includes an end 772 and another end (not shown) that connects to a wastegate 780, which includes a plug portion 782 positionable by rotation of the shaft 770 in the bore 727, for example, by movement of a control arm 760 connected to the shaft 770. For example, the shaft 770 may connect to a wastegate arm portion 784 where such a connection may be integral to the wastegate arm portion 784 (e.g., a unitary piece) or via a connection mechanism (e.g., a socket, a thread, a weld, etc.). The shaft 770 may be configured to rotate a certain number of degrees ($\Delta\Theta_s$) about its shaft axis ($z_s$), which may be substantially aligned with the bore axis ($z_B$). For example, rotation of about 30 degrees of the shaft 770 in the bore 727 may provide for moving a plug portion 782 from a fully open position to a closed position with respect to an opening.

In the example of FIG. 7, a conduit 796 includes a lumen 797 where an end 799 of the conduit 796 extends into the intersecting bore 726 to the bore 727 or otherwise provides for fluid connection between the lumen 797 and the bore 727. As an example, the end 799 of the conduit 796 may extend into the bore 727 and into a gap 778 of the bushing 775 for fluid communication with a space 779 defined by an inner annular groove 779 of the bushing 775. In such a manner, where the lumen 797 provides a pressure P2 less than a pressure P1 and less than a pressure P0, fluid from the chamber 745 and possibly from the air environment may flow to the lumen 797. Accordingly, flow of exhaust from the exhaust environment to the air environment may be reduced (e.g., or substantially eliminated).

As shown in the example of FIG. 7, the conduit 796 may connect to a blunt body 790 (e.g., optionally being an integral part of the blunt body 790) such that the lumen 797 is in fluid communication with a lumen 793 of the blunt body 790. The blunt body 790 can include an opening 791 (or openings) located at an end 792 of the blunt body where the opening 791 is an opening of the lumen 793. Where the opening 791 is oriented away from a direction of fluid flow, flow about the blunt body 790 can generate suction that may cause flow of fluid through the lumen 793 that exits the blunt body 790 via the opening 791. Thus, in the example of FIG. 7, the blunt body 790 may provide a pressure responsive to fluid flow where the pressure can be used to reduce leakage of exhaust with respect to a shaft disposed in a bore.

As an example, the blunt body 790 may be formed from a tube having a diameter ($d_t$) where the tube is cut at an angle such that the lumen 793 has an opening 791 with an elliptical perimeter. In such an example, the opening 791 may be defined by a major axis (a) and a minor axis (b). As an example, a ratio of a minor axis (b) to a major axis (a) may depend on angle of a plane with respect to a central axis of rotation of a tube. Further, cross-sectional area of an opening (e.g., the opening 791) may be selected based in part on such an angle, for example, along with one or more lumen dimensions (e.g., consider a lumen inner diameter).

In the example of FIG. 7, the bushing 775 is shown along with various lines and arrows to indicate dimensions with respect to a bushing axis ($z_b$) and radial coordinate direction ($r_b$). For example, shown in FIG. 7 are an inner radius ($r_i$), an outer radius ($r_o$), a length ($\Delta z_b$), a gap length ($\Delta z_g$), a gap radial depth ($\Delta r_b$) and an angle of a gap opening ($\Delta \Theta_b$). As an example, a bushing may be formed as a cylinder with one or more gaps that can form a space or spaces within a bore, the bore configured for receipt of a shaft fitted with the bushing. In such an example, the bushing may act to physically reduce leakage of fluid and form one or more spaces that can be subject to a reduced pressure that acts to extract fluid that may be leaking.

As shown in the example of FIG. 7, the axes of the shaft 770 and the bushing 775 are substantially aligned with the axis of the bore 727. Various radial clearances exist between the shaft 770, the bushing 775 and the bore 727, which may vary over time and, for example, with respect to the rotational position of the shaft 770 in the bore 727. As an example, a pressure differential may increase when the shaft 770 is rotated in the bore 727 (e.g., as supported by the bushing 775) to position the plug portion 782 in an open position with respect to a wastegate opening. In such an example, exhaust may flow from an exhaust side of the bore 727 in a clearance between the shaft 770 and the bushing 775 to the gap space of the bushing 775 where a reduced pressure is provided in the lumen 797 at the end 799 of the conduit 796 such that the exhaust flowing in the clearance flows to the lumen 797 of the conduit 796. As an example, the reduced pressure may be generated via the blunt body 790 having a lumen 793 in fluid communication with the lumen 797 of the conduit 796. Further, the exhaust flowing in the lumen 797 of the conduit 796 may be evacuated to an exhaust passage via the opening 791 to the lumen 793 of the blunt body 790. In such a manner, exhaust leakage via the bore 727 (e.g., between an outer surface of the shaft 770 and an inner surface of the bushing 775) may be redirected rather than flowing to an external end of the bore 727 (e.g., between an outer surface of the shaft 770 and an inner surface of the bushing 775); noting that exhaust flow via the external end of the bore may be detrimental. Specifically, undesirable exhaust leakage from an assembly may make it more difficult for an internal combustion engine fitted with that assembly to meet emissions standards.

In the example of FIG. 7, exhaust may be redirected to an exhaust passage that leads to, for example, a treatment unit such as a catalytic converter or other exhaust gas treatment equipment (see, e.g., the vehicle 101 of FIG. 1). Where a vehicle includes an internal combustion engine mounted in front of a passenger cabin, an arrangement such as that of FIG. 7 (e.g., or various other examples described herein), exhaust may be redirected to an exhaust passage with an exit behind the passenger cabin to thereby reduce risk of exhaust leaking into the passenger cabin (e.g., to reduce leakage of exhaust from an engine compartment to a passenger cabin). Thus, as an example, a blunt body approach to reducing exhaust leakage from an assembly may improve emissions and improve safety of a passenger cabin.

As an example, where exhaust includes particulate matter, a bore for receiving a control shaft may include a pressure reduction mechanism that acts to reduce deposition of particulate matter within the bore. For example, where particulate matter can act to increase friction (e.g., by reducing clearance, by altering surface properties, etc.) between surfaces (e.g., bore and bushing surfaces, bore and shaft surfaces, shaft and bushing surfaces, etc.), a reduced pressure of a conduit (e.g., such as the conduit 796) may help to decrease deposition, buildup, etc., of particulate matter.

Figure 8:
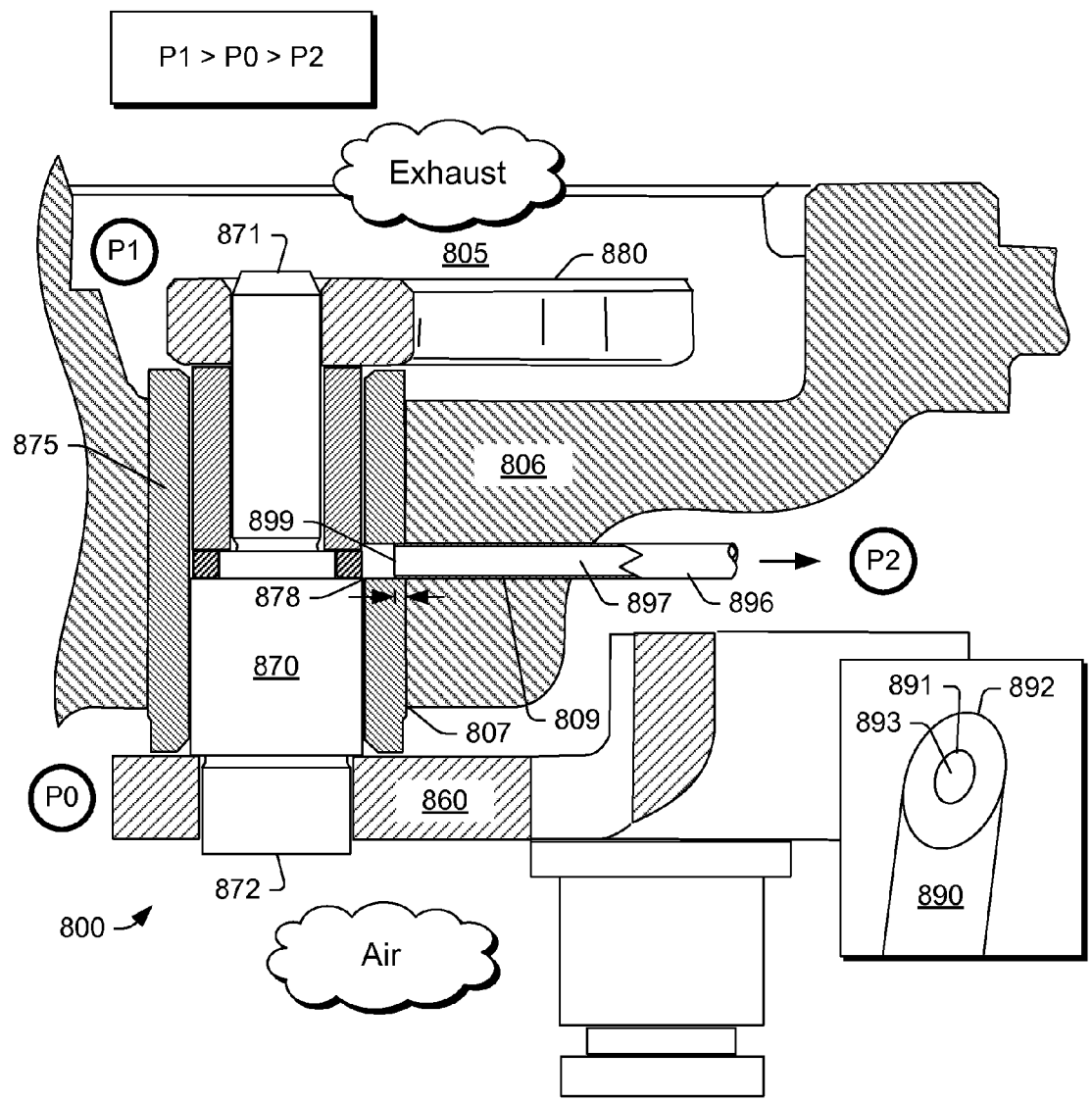
FIG. 8 is a cutaway view of an example of an assembly that includes a control shaft disposed in a control shaft bore for controlling a variable geometry mechanism.

FIG. 8 shows an example of an assembly 800 that includes a component 806 with a bore 807 that extends between an exhaust environment, associated with a chamber 805, that may have a pressure P1 and an ambient or air environment that may have a pressure P0. In the example of FIG. 8, a shaft 870 is disposed in the bore 807 along with a bushing 875 and the component 806 defines an intersecting bore 809 that intersects the bore 807. The shaft 870 includes an end 872 and another end 871 that connects to an arm 880, which may be an arm for control of a variable geometry mechanism, the arm 880 positionable by rotation of the shaft 870 in the bore 807, for example, by movement of a control arm 860 connected to the shaft 870.

In the example of FIG. 8, a conduit 896 includes a lumen 897 where an end 899 of the conduit 896 extends into the intersecting bore 809 to the bore 807 or otherwise provides for fluid connection between the lumen 897 and the bore 807. As an example, the end 899 of the conduit 896 may extend into the bore 807 and into a gap 878 of the bushing 875 for fluid communication with a space, for example, defined in part by one or more components disposed within the bore 807. In such a manner, where the lumen 897 provides a pressure P2 less than a pressure P1 and less than a pressure P0, fluid from the chamber 805 and possibly from the air environment may flow to the lumen 897. Accordingly, flow of exhaust from the exhaust environment to the air environment may be reduced (e.g., or substantially eliminated).

As shown in the example of FIG. 8, the conduit 896 may connect to a blunt body 890 (e.g., optionally being an integral part of the blunt body 890) such that the lumen 897 is in fluid communication with a lumen 893 of the blunt body 890. The blunt body 890 can include an opening 891 (or openings) located at an end 892 of the blunt body where the opening 891 is an opening of the lumen 893. Where the opening 891 is oriented away from a direction of fluid flow, flow about the blunt body 890 can generate suction that may cause flow of fluid through the lumen 893 that exits the blunt body 890 via the opening 891. Thus, in the example of FIG. 8, the blunt body 890 may provide a pressure responsive to fluid flow where the pressure can be used to reduce leakage of exhaust with respect to a shaft disposed in a bore.

In the example of FIG. 8, the bushing 875 may be formed as a cylinder with one or more gaps that can form a space or spaces within a bore, the bore configured for receipt of a shaft fitted with the bushing. In such an example, the bushing may act to physically reduce leakage of fluid and form one or more spaces that can be subject to a reduced pressure that acts to extract fluid that may be leaking.

Figure 9:
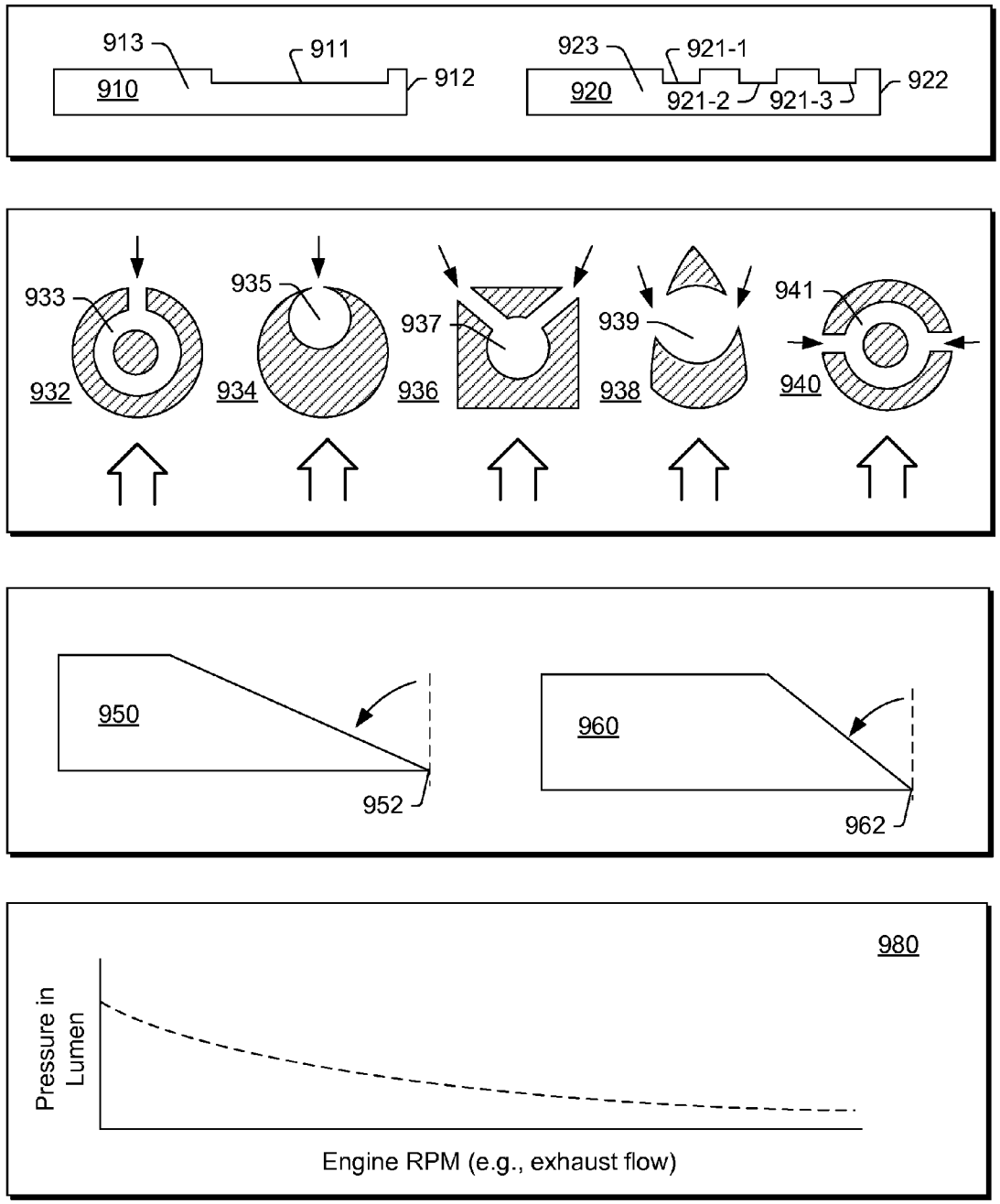
FIG. 9 is a series of diagrams of examples of features and configurations of blunt bodies along with an example of a plot of pressure versus engine speed.

FIG. 9 shows various examples of features of blunt bodies 910, 920, 932, 934, 936, 938, 940, 950 and 960 along with an example of a plot 980 of lumen pressure versus engine speed in revolutions per minute (RPM). As shown in FIG. 9, a blunt body may include one or more openings. For example, the blunt body 910 includes an opening 911 disposed near an end 912 where the opening is in fluid communication with a lumen 913 of the blunt body 910. As another example, the blunt body 920 includes openings 921-1, 921-2 and 921-3 disposed near an end 922 of the blunt body 920 where the openings 921-1, 921-2 and 921-3 are in fluid communication with a lumen 923 of the blunt body 920.

FIG. 9 shows various examples of cross-sections of a blunt body 932, 934, 936, 938 and 940. In the example of FIG. 9, the cross-sections 932, 934, 936, 938 and 940 are shown with respect to oncoming fluid flow and pressure flow to a respective lumen 933, 935, 937, 939 and 941. Such flow may be via one or more openings. As an example, an opening may be positioned (e.g., located) based at least in part on a flow profile past a blunt body. For example, data may be provided for pressure profiles about a blunt body with respect to flow rates impinging on the blunt body. In such an example, one or more openings may be positioned at a location or locations that correspond to low pressure or low pressures.

Referring again to the plot 407 of FIG. 4, at certain Reynolds numbers, a cylindrical surface has pressure minima at about 90 degrees and about 270 degrees; however, as Reynolds number increases, a pressure minimum exists at about 180 degrees. As an example, an opening or openings of a blunt body may be positioned based at least in part on expected Reynolds number or Reynolds numbers of flow impinging on a blunt body. As an example, pressure may be considered and related to flows (e.g., Reynolds numbers) that may increase risk of exhaust leakage. As an example, openings may be positioned as in the examples 936, 938 and 940 where a pressure minimum does not exist at about 180 degrees but rather where pressure minima exist (e.g., symmetrically about a blunt body). As an example, an opening may be positioned as in the examples 932 and 934 where a pressure minimum exists at about 180 degrees. As an example, a blunt body may include an opening at about 180 degrees and other openings (e.g., an opening as in the example 932 and openings as in the example 940). In such an example, a pressure minimum may exist for high Reynolds number flow at the opening at about 180 degrees and pressure minima may exist at the other openings for lower Reynolds numbers. In such a manner, a blunt body may be configured with openings to provide reduced pressure in a lumen of the blunt body over a range of Reynolds numbers (e.g., where pressure profile about the blunt body depends on Reynolds number).

FIG. 9 shows examples of blunt bodies 950 and 960 with ends 952 and 962 that are formed via an angle. As an example, an angle may be an angle selected from a range of angles from about 75 degrees to about 0 degrees (e.g., a flat end perpendicular to an axis of a blunt body). For the blunt bodies 950 and 960, a lumen may appear in an elongated shape (e.g., oval, ellipsoid, etc.) such that as the angle increases, the area of an opening to the lumen may increase.

As to the plot 980 of FIG. 9, it represents trial data for a blunt body such as the blunt body 590 of the assembly 500 of FIG. 5. Various trials were performed using various blunt body features, configurations, etc. As an example, a trial was performed using a 3 liter diesel engine fitted with a Garrett® GT2502 S turbocharger. Blunt bodies were formed from pipes, for example, having inner diameters (e.g., lumen) of about 2 mm and of about 4 mm. As to angles for ends of the pipes, various angles were tested. As to position and orientation of a blunt body, various positions and orientations were tested.

Trial data indicated that a trend exists with reduction in pressure with reduction in slit angle. As an example, a difference of the order of about 10 mbar was observed with change of about 15 degrees in slit angle. In trials, a blunt body was rotated along its axis to examine orientation of its opening with respect to direction of exhaust flow from a turbine wheel. Trail data indicated suitable suction with the blunt body oriented approximately perpendicular to the turbine wheel axis but away from the flow direction (away from oncoming flow).

As an example, a trial positioned and oriented a blunt body and connected the lumen of the blunt body to a bore having a wastegate control shaft and bushing disposed therein. Effective sealing was observed as suction pressure below atmospheric (e.g., ambient environment) existed for various operational conditions examined. As an example, a blunt body may be positioned with respect to a flow stream such as a flow stream associated with a compressor (e.g., inlet, outlet, internal, etc.). In such an example, pressure achieved via placement of the blunt body may be used to reduce blow-by. As an example, multiple blunt bodies may be positioned for one or more purposes.

As an example, a method can include providing a groove along an inner diameter of a bushing, an outer diameter of a shaft or both (e.g., to define a space) and connecting the space with a lumen of a blunt body located in an exhaust flow stream (e.g., or other turbulent flow source, capable of creating sufficient suction). As an example, a blunt body may be manufactured from a material such as stainless steel. As an example, a portion of a conduit may be formed via casting, for example, as during casting of a housing such as a turbine housing that includes a bore. As an example, a location of a blunt body may be optimized and a space or spaces may be optimized to utilize suction pressure created by flow past the blunt body. As an example, optimization may occur based on back-pressure in exhaust, temperature, etc.

As mentioned, a turbine housing wastegate assembly may be prone to leakage of untreated exhaust gas due to clearance available between a shaft and a bushing disposed in a bore of the turbine housing. In such an example, the bushing may be configured to provide suitable kinematics of a wastegate mechanism at high temperatures (e.g., elasticity, expansion, contraction, etc.). As an example, multiple components may be provided (e.g., bushings, rings, etc.) to achieve suitable operational characteristics. As an example, suction pressure from a blunt body may be utilized to reduce leakage through a shaft and bushing assembly positioned in a bore of a housing where a reduction in leakage may help to meet stringent emission standards.

As an example suction pressure may help to reduce risk of seizure of a rotating component in a bore, for example, by reducing soot deposition during operation. For example, a diesel engine fitted with a turbocharger may include a wastegate with a control shaft disposed in a control shaft bore where a risk exists for passage of diesel exhaust through one or more clearances within the control shaft bore (e.g., with respect to the shaft, a bushing, a ring, etc.) and where suction pressure can help reduce deposition of particulate matter in the diesel exhaust in the one or more clearances. Such an example may help to improve efficiency and reliability of a control mechanism for the wastegate. While the foregoing example mentions a wastegate, a control shaft for a variable geometry mechanism or a control shaft for another mechanism may benefit from such suction pressure (e.g., achieved by positioning a blunt body in a flow stream where the blunt body includes one or more openings not facing oncoming flow).

As an example, a system can include a turbine housing that defines a turbine wheel space, an exhaust chamber in fluid communication with the turbine wheel space and a control shaft bore that extends from the exhaust chamber to an outer surface of the turbine housing; a blunt body positionable above the turbine wheel space where the blunt body includes an opening and a lumen in fluid communication with the opening; and a suction conduit connectable for fluid communication between the control shaft bore of the turbine housing and the lumen of the blunt body. In such an example, the turbine housing may define a wastegate opening in fluid communication with the exhaust chamber and where the control shaft bore is configured for receipt of a wastegate control shaft.

As an example, a system may include a control shaft bore defined by a turbine housing where the control shaft bore is configured for receipt of a variable geometry mechanism control shaft.

As an example, an exhaust conduit may be connectable to a turbine housing where the exhaust conduit defines an exhaust passage and where a blunt body is positionable in the exhaust passage above a turbine wheel space. In such an example, an opening of the blunt body may be positioned above the turbine wheel space and may be oriented away from the turbine wheel space.

As an example, a turbine housing may define an intersecting bore that intersects a control shaft bore. In such an example, a suction conduit may be connected for fluid communication from the control shaft bore to a lumen of a blunt body via the intersecting bore. As an example, such an intersecting bore may be configured for receipt of an end of the suction conduit (e.g., larger diameter, threads, etc.). As an example, an end of a suction conduit may extend into a control shaft bore.

As an example, a system may include a control shaft and a bushing where the control shaft and the bushing are disposed, at least partially, in a control shaft bore. In such an example, the bushing may include a recess (e.g., an annular groove, etc.) and a suction conduit may be connected for fluid communication between the recess and a lumen of a blunt body (e.g., positionable in a turbulent fluid stream to generate suction pressure in the lumen). In such an example, the bushing can include a gap configured for receipt of an end of the suction conduit.

As an example, a turbocharger can include a center housing assembly that includes a through bore; a compressor housing assembly operatively coupled to the center housing assembly; a turbine housing assembly operatively coupled to the center housing assembly where the turbine housing assembly defines a turbine wheel space, an exhaust chamber in fluid communication with the turbine wheel space and a control shaft bore that extends from the exhaust chamber to an outer surface of the turbine housing assembly; a turbine wheel disposed in the turbine wheel space; a shaft connected to the turbine wheel, the shaft rotatably supported in the through bore of the center housing assembly; a control shaft disposed in the control shaft bore of the turbine housing assembly; a blunt body positioned above the turbine wheel where the blunt body includes an opening and a lumen in fluid communication with the opening; and a suction conduit connected for fluid communication between the control shaft bore of the turbine housing assembly and the lumen of the blunt body. In such an example, the turbocharger may include a bushing disposed in the control shaft bore at least partially about the control shaft.

As an example, the aforementioned turbocharger may include a wastegate opening defined by the turbine housing assembly, the wastegate opening in fluid communication with the exhaust chamber and the control shaft rotatable in the control shaft bore about a rotational axis to position a wastegate plug in a closed position or an open position with respect to the wastegate opening. Alternatively or additionally, the aforementioned turbocharger may include a variable geometry mechanism where the control shaft is rotatable in the control shaft bore about a rotational axis to adjust the variable geometry mechanism (e.g., consider a VNT mechanism).

As an example, a method can include producing suction pressure by providing a blunt body in an oncoming turbulent fluid stream where the blunt body includes an opening facing away from the oncoming turbulent fluid flow stream and a lumen in fluid communication with the opening; and applying the suction pressure to a control shaft bore of a turbocharger by providing a conduit for fluid communication between the control shaft bore and the lumen of the blunt body. In such a method, the oncoming turbulent fluid stream may include exhaust (e.g., exhaust from an internal combustion engine). As an example, a method may include applying suction pressure to reduce leakage of exhaust from an exhaust chamber to an ambient environment. As an example, an oncoming turbulent fluid stream may be exhaust exiting a turbine wheel space having a turbine wheel disposed therein.

As an example, one or more blunt bodies may be implemented (e.g., disposed in a flow stream) in a two stage turbocharger system to reduce leakage, etc., of fluid via a bore for a control shaft (e.g., for control of a valve, etc.).

As an example, an assembly may include one or more blunt bodies disposed in a conduit, passage, etc., to provide a reduced pressure to be applied to a bore to reduce risk of seizure due to reduction in thermal variations around a bushing, a shaft, etc., disposed at least partially in the bore. As an example, such a reduced pressure may be applied to an assembly to reduce leakage of lubricant (e.g., oil) through a wastegate control shaft, in event of turbine side lubricant leakage.

As an example, an assembly may include a blunt body, a conduit and a formed feature (e.g., casted feature, machined feature, etc.) for creation of reduced pressure and conveyance of the reduced pressure to one or more clearances (e.g., with respect to a bore, a bushing, a shaft, etc.).

Although some examples of methods, devices, systems, arrangements, etc., have been illustrated in the accompanying Drawings and described in the foregoing Detailed Description, it will be understood that the example embodiments disclosed are not limiting, but are capable of numerous rearrangements, modifications and substitutions.

What is claimed is:

1. A system comprising:
   a turbine housing that defines a turbine wheel space, an exhaust chamber in fluid communication with the turbine wheel space and a control shaft bore that extends from the exhaust chamber to an ambient environment at an outer surface of the turbine housing;
   a turbine wheel disposed at least in part in the turbine wheel space wherein the turbine wheel comprises a rotational axis;
   a blunt body positioned an axial distance from the turbine wheel in an exhaust environment that is in fluid communication with the turbine wheel space wherein the blunt body comprises an opening in fluid communication with the exhaust environment and a lumen in fluid communication with the opening; and
   a suction conduit connected for fluid communication between the control shaft bore of the turbine housing and the lumen of the blunt body.

2. The system of claim 1 comprising a wastegate control shaft received at least in part by the control shaft bore wherein the turbine housing defines a wastegate opening in fluid communication with the exhaust chamber.

3. The system of claim 1 comprising a variable geometry mechanism control shaft received at least in part by the control shaft bore.

4. The system of claim 1 comprising an exhaust conduit connected to the turbine housing wherein the exhaust conduit defines an exhaust passage and wherein the blunt body is positioned in the exhaust passage.

5. The system of claim 4 wherein the opening of the blunt body is oriented away from the turbine wheel.

6. The system of claim 1 wherein the turbine housing defines an intersecting bore that intersects the control shaft bore.

7. The system of claim 6 wherein the suction conduit is connected for fluid communication from the control shaft bore to the lumen of the blunt body via the intersecting bore.

8. The system of claim 7 wherein the intersecting bore receives an end of the suction conduit.

9. The system of claim 8 wherein the end of the suction conduit extends into the control shaft bore.

10. The system of claim 1 comprising a control shaft and a bushing, the control shaft and the bushing disposed in the control shaft bore.

11. The system of claim 10 wherein the bushing comprises a recess and wherein the suction conduit is connected for fluid communication between the recess and the lumen of the blunt body.

12. The system of claim 10 wherein the bushing comprises a gap that receives an end of the suction conduit.

13. A turbocharger comprising:
    a center housing assembly that comprises a through bore;
    a compressor housing assembly operatively coupled to the center housing assembly;
    a turbine housing assembly operatively coupled to the center housing assembly wherein the turbine housing assembly defines a turbine wheel space, an exhaust chamber in fluid communication with the turbine wheel space and a control shaft bore that extends from the exhaust chamber to an ambient environment at an outer surface of the turbine housing assembly;
    a turbine wheel disposed in the turbine wheel space wherein the turbine wheel comprises a rotational axis;
    a shaft connected to the turbine wheel, the shaft rotatably supported in the through bore of the center housing assembly;
    a control shaft disposed in the control shaft bore of the turbine housing assembly;
    a blunt body positioned an axial distance from the turbine wheel in an exhaust environment that is in fluid communication with the turbine wheel space wherein the blunt body comprises an opening in fluid communication with the exhaust environment and a lumen in fluid communication with the opening; and
    a suction conduit connected for fluid communication between the control shaft bore of the turbine housing assembly and the lumen of the blunt body.

14. The turbocharger of claim 13 wherein the turbine housing assembly defines a wastegate opening in fluid communication with the exhaust chamber and wherein the control shaft is rotatable in the control shaft bore about a rotational axis to position a wastegate plug in a closed position or an open position with respect to the wastegate opening.

15. The turbocharger of claim 13 comprising a variable geometry mechanism wherein the control shaft is rotatable in the control shaft bore about a rotational axis to adjust the variable geometry mechanism.

16. The turbocharger of claim 13 comprising a bushing disposed in the control shaft bore at least partially about the control shaft.

17. A method of reducing leakage of exhaust gas from a control shaft bore of a turbocharger, the method comprising:
    supplying to the turbocharger the exhaust gas from an engine exhaust gas flow path, wherein the turbocharger comprises a housing defining a volute and a turbine wheel space;
    flowing exhaust gas from the volute to the turbine wheel space to rotate a turbine wheel disposed at least in part in the turbine wheel space;
    producing suction pressure via a blunt body in an oncoming turbulent fluid stream of exhaust gas exiting the turbine wheel space wherein the blunt body comprises an opening facing away from the oncoming turbulent fluid stream of exhaust gas and a lumen in fluid communication with the opening; and
    applying the suction pressure to the control shaft bore of the turbocharger via a conduit for fluid communication between the control shaft bore and the lumen of the blunt body.

18. The method of claim 17 further comprising, via the suction pressure, reducing leakage of exhaust from an exhaust chamber to an ambient environment via the control shaft bore, reducing deposition of particulate matter in the control shaft bore, or reducing the leakage of exhaust and reducing the deposition of particulate matter.

* * * * *